US011528192B2

(12) United States Patent
Arora et al.

(10) Patent No.: US 11,528,192 B2
(45) Date of Patent: Dec. 13, 2022

(54) INTELLIGENT ZERO TOUCH PROVISIONING FOR IPV6

(71) Applicant: HEWLETT PACKARD ENTERPRISE DEVELOPMENT LP, Houston, TX (US)

(72) Inventors: Praveen Kumar Arora, Bangalore (IN); Nitin Singla, Bangalore (IN); Yashavantha Nagaraju Naguvanahalli, Bangalore (IN); Tathagata Nandy, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 340 days.

(21) Appl. No.: 16/265,781

(22) Filed: Feb. 1, 2019

(65) Prior Publication Data

US 2020/0252287 A1    Aug. 6, 2020

(51) Int. Cl.
| | | |
|---|---|---|
| *H04L 41/08* | (2022.01) | |
| *H04L 41/0806* | (2022.01) | |
| *H04L 61/5014* | (2022.01) | |
| *H04L 101/659* | (2022.01) | |

(52) U.S. Cl.
CPC ...... *H04L 41/0886* (2013.01); *H04L 41/0806* (2013.01); *H04L 41/0889* (2013.01); *H04L 61/5014* (2022.05); *H04L 2101/659* (2022.05)

(58) Field of Classification Search
CPC ............. H04L 41/0886; H04L 41/0806; H04L 41/0889; H04L 61/2015
USPC .................................................. 709/222, 224
See application file for complete search history.

(56) References Cited

U.S. PATENT DOCUMENTS

| | | | |
|---|---|---|---|
| 7,420,933 B2 | 9/2008 | Booth et al. | |
| 8,347,355 B2 * | 1/2013 | Mower | H04L 67/025 |
| | | | 726/3 |
| 9,237,153 B2 | 1/2016 | Francisco et al. | |
| 9,344,333 B2 | 5/2016 | Dibirdi et al. | |

(Continued)

OTHER PUBLICATIONS

K. Watsen, Zero touch Provisioning, Mar. 9, 2015, Netconf Working group (Year: 2015).*

(Continued)

*Primary Examiner* — David R Lazaro
*Assistant Examiner* — Mariegeorges A Henry
(74) *Attorney, Agent, or Firm* — McDermott Will & Emery

(57) ABSTRACT

A network device may send, to a Dynamic Host Configuration Protocol (DHCP) server, a request for an Internet Protocol version 6 (IPv6) address to be assigned to a management port of the network device, wherein IPv6 is disabled at the network device, and may receive a message that includes information associated with a network management system (NMS) and IPv6 configuration information for enabling IPv6 processing on the management port. In response to receiving the IPv6 configuration information, the network device may enable IPv6 processing on the management port of the network device and may register with the NMS based at least in part on the information associated with the NMS. The network device may, in response to receiving one or more configuration commands sent from the NMS to the management port of the network device, configure the network device according to the one or more configuration commands.

20 Claims, 7 Drawing Sheets

(56) References Cited

U.S. PATENT DOCUMENTS

| | | | | |
|---|---|---|---|---|
| 2006/0271982 | A1* | 11/2006 | Gallou | H04L 29/06027 725/100 |
| 2012/0324063 | A1* | 12/2012 | Wang | H04L 41/0886 709/220 |
| 2015/0012763 | A1* | 1/2015 | Cohen | H04L 67/125 713/310 |
| 2016/0134491 | A1 | 5/2016 | Cordray et al. | |
| 2016/0182691 | A1* | 6/2016 | Perreault | H04L 61/6086 709/230 |
| 2019/0036875 | A1* | 1/2019 | Jimenez | H04W 88/16 |

OTHER PUBLICATIONS

Configuring Zero Touch Provisioning, (Research Paper). Retrieved Oct. 19, 2018, 6 Pgs.

Watsen, K. et al., Zero Touch Provisioning for Netconf Call Home (zerotouch), (Research Paper), Sep. 10, 2015, 31 Pgs.

"DHCP with Vendor-Specific Options", May 6, 2018, available online at <https://web.archive.org/web/20180506224011/http://www.arubanetworks.com/techdocs/ArubaOS_60/UserGuide/DHCP_Option_43.php>, 4 pages.

"Dynamic Host Configuration Protocol (DHCP) and Bootstrap Protocol (BOOTP) Parameters", Jan. 31, 2019, available online at <https://web.archive.org/web/20190131235003/https://www.iana.org/assignments/bootp-dhcp-parameters/bootp-dhcp-parameters.xhtml>, 12 pages.

Alexander et al., "DHCP Options and BOOTP Vendor Extensions", Mar. 1997, RFC 2132, 34 pages.

Cisco, "DHCP Option 43 for Lightweight Cisco Aironet Access Points Configuration Example", Oct. 29, 2018, available online at <https://www.cisco.com/c/en/us/support/docs/wireless-mobility/wireless-lan-wlan/97066-dhcp-option-43-00.html>, 23 pages.

Corsec, "DoDIN APL", retrieved in 2019, available online at <https://www.corsec.com/dodin-apl/>, 4 pages.

Infoblox, "About IPv4 DHCP Options", Oct. 12, 2018, available online at <https://docs.infoblox.com/display/NAG8/About+IPv4+DHCP+Options>, 16 pages.

Juniper Networks, "Dedicated Session Database and Vendor-Specific Attributes for DHCPv4 and DHCPv6 Subscribers", retrieved in 2019, 42 pages.

Juniper Networks, "vendor-specific (dhcp-relay)", retrieved in 2019, 42 pages.

Tom Salmon, "ISC DHCP Server—Option 43 (Vendor specific attribute)", 2017, available online at <https://tomsalmon.eu/2017/02/isc-dhcp-server-option-43-vendor-specific-attribute/>, 2 pages.

* cited by examiner

INTELLIGENT ZERO TOUCH PROVISIONING FOR IPV6

BACKGROUND

Zero touch provisioning is a technique by which a network device after it is physically installed can be automatically provisioned and configured by a network management system when the network device boots up for the first time, with minimal or no intervention by an administrator at the network device. When a network device boots up for the first time, the network device may communicate with a network management system to receive configuration commands that the network device may execute to configure itself, thereby reducing the amount of intervention required from an administrator to configure the network device. In this way, an organization or enterprise can quickly roll out networks comprising hundreds or thousands of network devices without having to perform manual configuration of each of the network devices The description provided in the background section should not be assumed to be prior art merely because it is mentioned in or associated with the background section. The background section may include information that describes one or more aspects of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
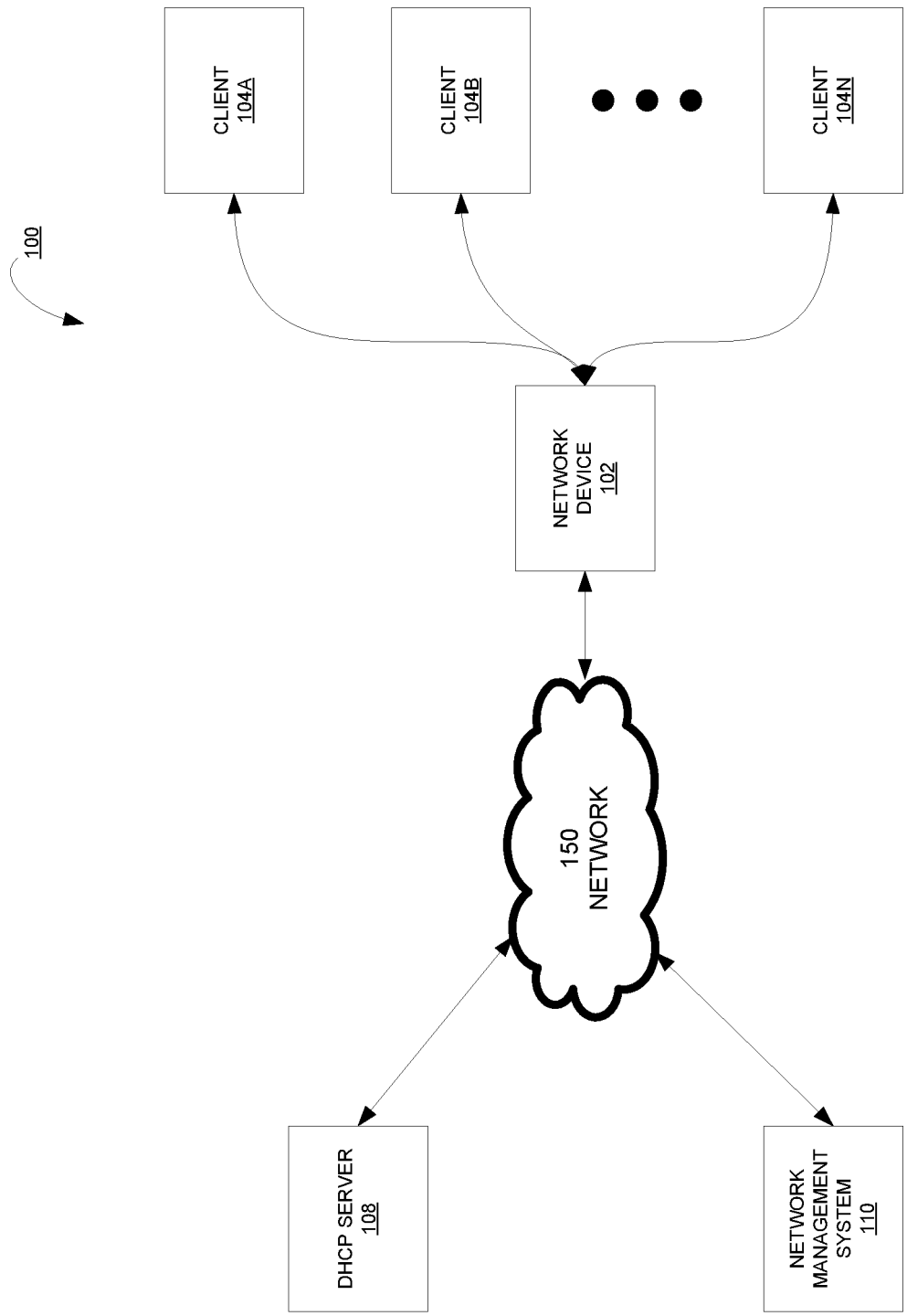
FIG. 1 illustrates an example architecture for intelligent IPv6 enablement for zero touch provisioning of an example network device.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for intelligent enablement of Internet Protocol version 6 (IPv6) for a network device in order to perform zero touch provisioning of the network device. Some network devices may have IPv6 turned off in order to meet certain client requirements. For example, the Department of Defense may require that products fulfill a set of requirements in order to be included in the Department of Defense Information Network (DoDIN) Approved Products List (APL). For example, the Department of Defense may require that network devices have IPv6 turned off by default for security purposes in order to be placed on the DoDIN APL.

As such, network devices that meet the requirements of the DoDIN APL may have IPv6 disabled out-of-the-box by default, so that the network devices may not be able to communicate with other devices in an IPv6-based network. In particular, a network device having IPv6 disabled may not be able to communicate with a network management system in an IPv6-based network in order to perform zero touch provisioning of the network device.

One potential technique for overcoming this technical problem may be to enable IPv6 on the data ports of the network device and communicating with the network management system via one of the data ports of the network device. However, enabling IPv6 on the data ports of the network device may pose security concerns associated with IPv6 networking, such as host-scanning attacks.

In accordance with aspects of the present disclosure, the disclosed system overcomes the technical problem of providing zero touch provisioning via IPv6 of network devices that have IPv6 disabled by default by using a Dynamic Host Configuration Protocol (DHCP) server to assign an IPv6 address to the management port of a network device having IPv6 disabled by default, and by using the management port of the network device to communicate with the network management system via an IPv6 network to perform zero touch provisioning of the network device. Because the management port of a network device operates on a management plane that is separate from a data plane used by data ports of the network device, the management port provides improved security for the network device by limiting management access of the network device to the management port, thereby preventing malicious attempts to gain management access to the network device.

The disclosed system addresses a technical problem tied to computer technology and arising in the realm of computer networks, namely the technical problem of utilizing a network management system on an IPv6 network to provide zero touch provisioning of network devices that have IPv6 disabled by default. The disclosed system solves this technical problem by communicating with a DHCP server to enable IPv6 on the management port of the network device without enabling IPv6 on other data port interfaces of the network device and to receive network management system credentials, so that the network device may communicate with the network management system via IPv6 to perform zero touch provisioning of the network device via the management port of the network device. By selectively enabling IPv6 on the management port of the network device and utilizing the management port of the network device to communicate with the network management system to perform zero touch provisioning without enabling IPv6 on other data ports of the network device, the disclosed system thereby maintains the security of the networking device while allowing zero touch provisioning of the network device via a network management system over an IPv6 network.

According to certain aspects of the present disclosure, a computer-implemented method for intelligent Internet Protocol version 6 (IPv6) enablement for zero touch provisioning of a network device is provided. The method includes sending, by a network device having Internet Protocol version 6 (IPv6) disabled to a Dynamic Host Configuration Protocol (DHCP) server, a request for an IPv6 address to be assigned to a management port of the network device. The method further includes receiving, by the network device from the DHCP server, a message that includes information associated with a network management system (NMS) and IPv6 configuration information for enabling IPv6 processing on the management port of the network device that is in response to the request for the IPv6 address. The method further includes in response to receiving the IPv6 configuration information, enabling IPv6 processing on the management port of the network device. The method further includes in response to receiving the information associated with the NMS, registering, by the network device, the network device with the NMS based at least in part on the information associated with the NMS. The method further includes in response to receiving one or more configuration commands sent from the NMS to the management port of the network device, configuring, by the network device, the network device according to the one or more configuration commands.

According to certain aspects of the present disclosure, a network device having for intelligent Internet Protocol version 6 (IPv6) enablement for zero touch provisioning is provided. The network device includes a memory. The network device further includes a management port. The network device further includes a processor operably coupled to the memory and the management port and configured to execute instructions which, when executed, cause the processor to: send, to a Dynamic Host Configuration Protocol (DHCP) server, a request for an Internet Protocol version 6 (IPv6) address to be assigned to the management port of the network device, wherein IPv6 is disabled at the network device; receive, from the DHCP server, a message that includes information associated with a network management system (NMS) and IPv6 configuration information for enabling IPv6 processing on the management port of the network device that is in response to the request for the IPv6 address; in response to receiving the IPv6 configuration information, enable IPv6 processing on the management port of the network device; in response to receiving the information associated with the NMS, register with the NMS based at least in part on the information associated with the NMS; and in response to receiving one or more configuration commands sent from the NMS to the management port of the network device, configure the network device according to the one or more configuration commands.

According to certain aspects of the present disclosure, a non-transitory machine-readable storage medium comprising machine-readable instructions for causing a processor of a network device to execute a method for intelligent Internet Protocol version 6 (IPv6) enablement for zero touch provisioning is provided. The method includes sending, to a Dynamic Host Configuration Protocol (DHCP) server, a request for an Internet Protocol version 6 (IPv6) address to be assigned to a management port of the network device, wherein IPv6 is disabled at the network device. The method further includes receiving, from the DHCP server, a message that includes information associated with a network management system (NMS) and IPv6 configuration information for enabling IPv6 processing on the management port of the network device that is in response to the request for the IPv6 address. The method further includes in response to receiving the IPv6 configuration information, enabling IPv6 processing on the management port of the network device. The method further includes in response to receiving the information associated with the NMS, registering with the NMS based at least in part on the information associated with the NMS. The method further includes in response to receiving one or more configuration commands sent from the NMS to the management port of the network device, configuring the network device according to the one or more configuration commands.

According to certain aspects of the present disclosure, an apparatus for intelligent Internet Protocol version 6 (IPv6) enablement for zero touch provisioning is provided. The apparatus includes means for sending, to a Dynamic Host Configuration Protocol (DHCP) server, a request for an Internet Protocol version 6 (IPv6) address to be assigned to a management port of the apparatus, wherein IPv6 is disabled at the apparatus. The apparatus further includes means for receiving, from the DHCP server, a message that includes information associated with a network management system (NMS) and IPv6 configuration information for enabling IPv6 processing on the management port of the apparatus that is in response to the request for the IPv6 address. The apparatus further includes means for, in response to receiving the IPv6 configuration information, enabling IPv6 processing on the management port of the apparatus. The apparatus further includes means for, in response to receiving the information associated with the NMS, registering with the NMS based at least in part on the information associated with the NMS. The apparatus further includes means for, in response to receiving one or more configuration commands sent from the NMS to the management port of the apparatus, configuring the apparatus according to the one or more configuration commands.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1 illustrates an example architecture 100 for intelligent IPv6 enablement for zero touch provisioning of a network device. The architecture 100 includes network device 102, Dynamic Host Configuration Protocol (DHCP) server 108, and network management system (NMS) 110 connected over network 150.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like. In the example of FIG. 1, network 150 may be an IPv6 network.

Network device 102 may be a switch, router, access point, or any other suitable hardware network device that connects clients 104A-104N (hereafter "clients 104") to receive, process, and forward data between clients 104. In some examples, network device 102 may be part of a local area network (LAN) or network device 102 may be a primary device out of the network devices of a virtual local area network (VLAN).

DHCP server 108 may be a DHCP for IPv6 (DHCPv6) server that is configured to assigned IPv6 addresses to network devices. In particular, DHCP server 108 may be configured to provide a mechanism for network devices to request global unicast IPv6 address assignments or to request configuration information from DHCP server 108. DHCP server 108 may also be configured to store information associated with NMS 110 so that DHCP 108 may send such information to network devices with which it communicates to enable such network devices to communicate with NMS 110 to perform zero touch configuration of those devices.

NMS 110 may include one or more servers or may be a cloud service that is configured to provide zero touch provisioning of network devices (e.g., network device 102) such as network switches, routers, access points, gateways, and the like. NMS 110 may connect to network devices, such as network device 102, via an IPv6 network such as network 150 to transmit commands to such network devices to provision, manage, and/or configure those network devices.

Network device 102 may have IPv6 disabled by default. When IPv6 is disabled, network device 102 may not be able to be configured via zero touch provisioning by NMS 110 via an IPv6 network, such as network 150. When network device 102 boots up for the first time, network device 102 may send to DHCP server 108 a request for an IPv6 address for a management port of network device 102. For example, network device 102 may execute an ipv6 address dhcp command that causes network device 102 to acquire an IPv6 address from DHCP server 108. In particular, network device 102 may acquire an IPv6 address for a management port of network device 102.

To acquire an IPv6 address, network device 102 may send a request to DHCP server 108 a request for an IPv6 network address to be assigned to a management port of network device 102. DHCP server 108 may receive the request from network device 102 and may determine whether DHCP network device 102 has information associated with NMS 110, such information for establishing a connection with NMS 110 for the purposes of zero touch provisioning. If DHCP server 108 does not contain the information for establishing a connection with NMS 110 for the purposes of zero touch provisioning, then DHCP server 108 may not be able to send such information associated with NMS 110 to network device 102. On the other hand, if DHCP server 108 has information associated with NMS 110, DHCP server 108 may, send to network device 102 a message that includes information associated with NMS 110 and IPv6 configuration information for enabling IPv6 processing on the management port of network device 102.

Network device 102 may receive from DHCP server 108 the message that message that includes information associated with NMS 110 and IPv6 configuration information for enabling IPv6 processing on the management port of network device 102. Network device 102 may, in response, enable IPv6 on the management port of the network device 102 based on the IPv6 configuration information received from DHCP server 108. For example, network device 102 may execute an ipv6 enable command to enable IPv6 processing on the management port of network device 102. The ipv6 enable command may automatically configure an IPv6 link-local unicast address on the interface while also enabling the interface of the management port for IPv6 processing.

Network device 102 may also, in response, also establish a secure connection with NMS 110 based on the information associated with NMS 110 to start the zero touch provisioning process. Such a secure connection may include Transport Layer Security, an Internet Protocol Security (IPSec) tunnel, and the like. Network device 102 may register itself with NMS 110 based at least in part on the information associated with the NMS as a network device for which NMS 110 may perform zero touch provisioning.

Upon network device 102 registering with NMS 110 as a network device, NMS 110 may perform zero touch provisioning of network device 102. For example, NMS 110 may send configuration commands to the management port of network device 102 to configure network device 102. Such configuration commands may include configuration scripts, configuration settings, and the like that network device 102 may perform to configure itself.

Network device 102 may receive such configuration commands from NMS 110 at its management port and may, in response to receiving configuration commands sent from NMS 110 to the management port of network device 102, configure itself according to the configuration commands. In this way, a network device 102 may able to meet DoDIN requirements while still being able to be configured and provisioned via zero touch provisioning with a minimum amount of user configuration.

Example Intelligent IPv6 Enablement System

Figure 2:
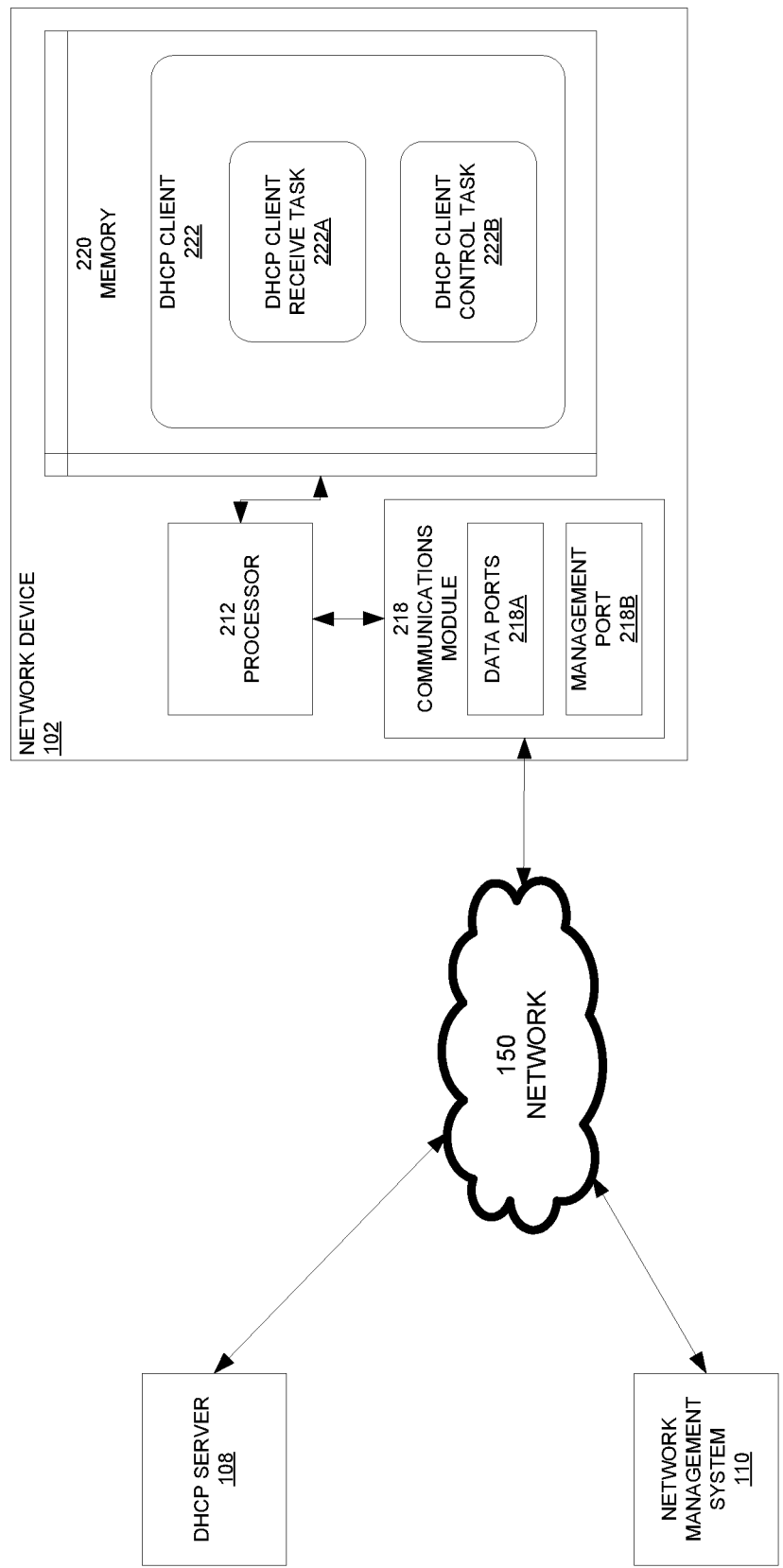
FIG. 2 is a block diagram illustrating the example network device from the architecture of FIG. 1 according to certain aspects of the disclosure.

FIG. 2 is a block diagram illustrating an example network device 102 in the architecture 100 of FIG. 1 according to certain aspects of the disclosure. As shown in FIG. 2, network device 102 includes processor 212, communications module 218, and memory 220. Communications module 218 is configured to interface with the network 150 to send and receive information, such as data, requests, responses, and commands to other devices on the network, such as DHCP server 108 and NMS 110. The communications 218 can be, for example, modems or Ethernet cards. Communications module 218 may include data ports 218A and management port 218B.

Management port 218B may operate on a management plane that is separate from the data plane used by data traffic sent and received by data ports 218A of network device 102 and by in-band management traffic of network device 102. This enables management port 218B to function even during periods of traffic congestion, equipment malfunction, or attacks on the network. Further, management port 218B provides improved security for network device 102 by limiting management access to management port 218B, thereby preventing malicious attempts to gain management access to network device 102 via data ports 218A. Management port 218B may, in some examples, also be referred to as an out-of-band management (OOBM) port.

Memory 220 may store information for processing during operation of network device 102. For example, memory 220 may store program instructions and/or information (e.g., data) associated with DHCP client 222.

Processor 212 of network device 102 is configured to execute instructions, such as instructions physically coded into processor 212, instructions received from software in memory 220, or a combination of both to implement functionality and/or execute instructions associated with network device 102. Examples of processor 212 include application processors, display controllers, auxiliary processors, one or more sensor hubs, or any other hardware configured to function as a processor, a processing unit, or a processing device.

DHCP client 222 may be operable by processor 212 to perform various actions, operations, or functions of computing device 210. For example, processor 212 may retrieve and execute instructions stored by memory 220 that cause processor 212 to perform the operations of DHCP client 222. The instructions, when executed by processor 212, may cause network device 102 to store information within memory 220.

In accordance with aspects of the present disclosure, processor 212 may execute instructions to send a request to DHCP server 108 for an IPv6 address to be assigned to management port 218B of network device 102. To send the request to DHCP server 108, processor 212 may execute instructions to send one or more Dynamic Host Configuration Protocol version 6 (DHCPv6) messages to DHCP server 108. For example, processor 212 may execute an ipv6 address dhcp command that causes network device 102 to send the request to DHCP server 108. The one or more DHCPv6 messages sent to DHCP server 108 may include a vendor class option that identifies a vendor that manufactured network device 102. The format and types of DHCPv6 messages that network device 102 sends to DHCP server 108 are discussed in further detail with respect to FIGS. 3A-3F.

DHCP server 108 may receive the request from network device 102 and may determine the information associated with NMS 110 that provides zero touch provisioning of network device 102 as well as the IPv6 configuration information for enabling IPv6 processing on management port 218B of network device 102. DHCP server 108 may, in response to receiving the request, determine the IPv6 network address that is to be assigned to network device 102 and determine the information associated with NMS 110 for providing zero touch provisioning of network device 102.

DHCP server 108 may use the vendor class option that it receives as part of the request to determine the appropriate information associated with NMS 110 to provide to network device 102. Because NMS 110 may contain different configuration settings for different network devices made by different vendors NMS 110 may select the information associated with NMS 110 to send to network device 102 based at least in part on the vendor class section indicated in the request from network device 102. DHCP server 108 may send to network device 102 a DHCPv6 message that includes information associated with NMS 110 and IPv6 configuration information for enabling IPv6 processing on management port 218B of network device 102 that is in response to the request for the IPv6 address.

Processor 212 may execute instructions to receive from DHCP server 102 the message that includes the information associated with NMS 110 and the IPv6 configuration information for enabling IPv6 processing on management port 218B of network device 102 that is in response to the request for the IPv6 address. IPv6 configuration information for enabling IPv6 processing on management port 218B may include an indication of the IPv6 address assigned by DHCP server 108 for management port 218B as well as an indication of one or more commands that network device 102 may execute to assign the IPv6 address to management port 218B. Network device 102.

In response to receiving the IPv6 configuration information, processor 212 may execute instructions to enable IPv6 processing on the management port of the network device. For example, processor 212 may execute an ipv6 enable command to enable IPv6 processing on the management port of network device 102 with the IPv6 address assigned by DHCP server 108.

In response to receiving the information associated with NMS 100, processor 212 may execute instructions to register with NMS 110 based at least in part on the information associated with NMS 110. The information associated with NMS 110 may include a shared secret, such as a password and the like, that is used to authenticate network device 102 with NMS 110. The information associated with NMS 100 may include the IPv6 address of NMS 100 and an indication of a location of a configuration script that contains the one or more configuration commands within the directory structure of NMS 110.

Processor 212 may execute instructions to send a registration request to the IPv6 address of NMS 110 included in the information associated with NMS 110. The registration request may include an indication of the shared secret and an indication location of a configuration script that contains the one or more configuration commands within the directory structure of NMS 110.

NMS 110 may receive the registration request from network device 102 and may authenticate network device 102 based on the received shared secret. If NMS 110 successfully authenticates network device 102, NMS 110 may retrieve the configuration script for performing zero touch provisioning of network device 102 form the indicated location of the configuration script within its directory structure, and may send the configuration script to network device 102.

Network device 102 may receive the configuration script sent from NMS 110 at management port 218B and processor 212 may execute instructions to configure network device 102 may executing the one or more commands contained in the configuration script.

To send and receive data to and from DHCP server 108 and NMS 110, Processor 212 may execute DHCP client 222 to send and receive data to and from DHCP server 108 and NMS 110. DHCP client 222 includes DHCP client receive task 222A and DHCP client control task 222B. Processor 212 may execute DHCP client receive task 222A to receive data from NMS DHCP server 108 and NMS 110.

Processor 212 may execute DHCP client receive task 222A to block on the socket bound to management port 218B and the port for communicating with DHCP server 108 by blocking on the socket of communications module 218 bound to IN6ADDR_ANY_INIT and User Datagram Protocol (UDP) port 546 respectively. Processor 212 may execute DHCP client receive task 222A to determine the destination IPv6 address and arriving interface index of data received by network device 102 by using the IPV6_PKTINFO option. In this way, processor 212 may execute DHCP client receive task 222A to determine whether the data packets it encounters were received by management port 218B of network device 102.

If DHCP client receive task 222A determines that the data packets it encounters were not received by management port 218B of network device 102, processor 212 may refrain from processing or executing such data packets. Thus, if DHCP client receive task 222A determines that configuration commands it encounters were not received by management port 218B of network device 102 processor 212 may refrain from executing those configuration commands.

On the other hand, if DHCP client receive task 222A determines that the data packets that it encounters were received by management port 218B of network device 102, processor 212 may execute DHCP client receive task 222A to post the data packets as messages to a message queue associated with DHCP client control task 222B. Thus if DHCP client receive task 222A determines that the configuration commands sent from NMS 110 were received by management port 218B of network device 102, processor 212 may execute the configuration commands to configure network device 102.

Processor 212 may execute DHCP client control task 222B to process messages posted in the associated message queue. Such messages may include timer messages, messages posted by DHCP client receive task 222A, or notification messages that indicate the occurrence of specific events of interest, such as the status of a virtual local area network (VLAN). Thus, when DHCP client control task 222B encounter a message in the message queue regarding configuration commands that were posted by DHCP client receive task 222A, processor 212 may execute DHCP client control task 222B to execute such configuration commands to configure network device 102.

Processor 212 may also execute DHCP client control task 222B to send DHCPv6 messages such as DHCPv6 messages to DHCP server 108 to request an IPv6 address for management port 218B. To send DHCPv6 messages, processor 212 may execute DHCP client control task 222B to write to the socket bound to IN6ADDR_ANY_INIT and User Datagram Protocol (UDP) port 546, as described above using the IPV6_PKTINFO socket option to specify the link-local address of network device 102 as the source IPv6 address, using the outgoing interface index, and using All_DHCP_Relay_Agents_And_Servers as the multicast destination IPv6 address to send out data packets as multicast messages on the specified interface index.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

FIGS. 3A-3F illustrate the example formats of messages that may be sent between example network device 102 and example DHCP server 108. Network device 102 and DHCP server 108 may send DHCPv6 messages to each other in order for network device 102 to request an IPv6 address for its management port and to receive information associated with NMS 110.

Figure 3A:
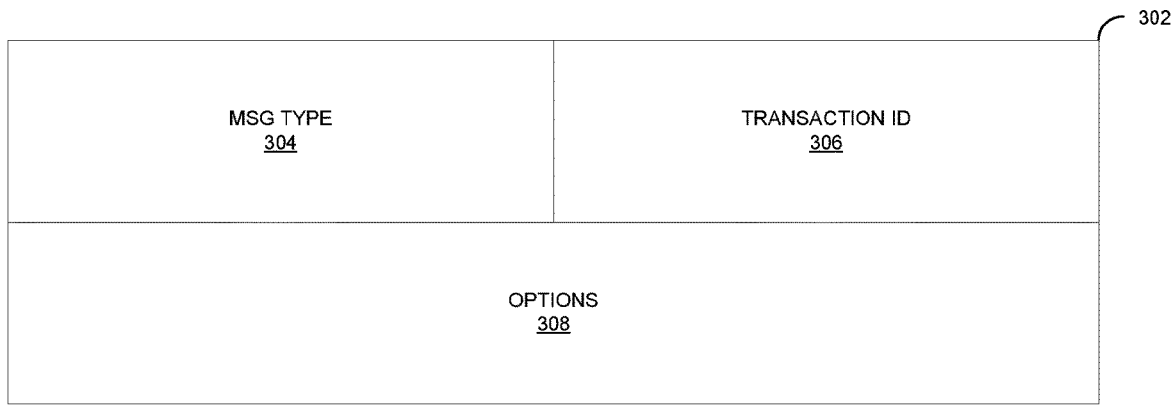
FIGS. 3A-3F illustrate the example formats of messages that may be sent between the example network device and the example DHCP server of FIGS. 1 and 2.

As shown in FIG. 3A, DHCPv6 message 302 may include message type field 304, transaction ID field 306, and options field 308. Message type field 304 may include a value that indicates the DHCPv6 message type for the message. Examples of message types include solicit advertise, request, confirm, renew, rebind, decline, release, reply, and reconfirm. Transaction ID field 306 may include a transaction ID used for a particular message exchange. A set of requests and replies between a network device and a DHCP server, such as between network device 102 and DHCP 108, may have the same transaction ID, so that the network device and DHCP server may keep track of which messages are part of which transactions.

Figure 3B:
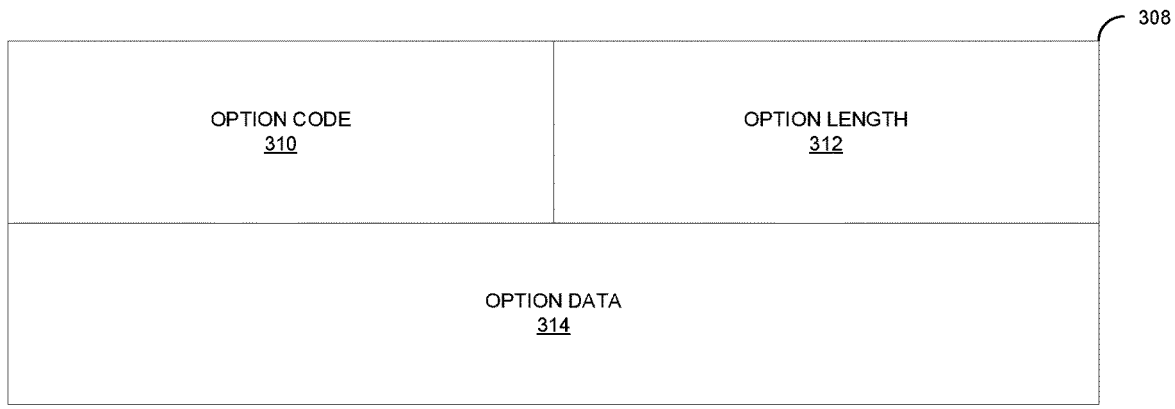

Options field 308 may indicate the DHCPv6 options that are carried in this message. Each DHCPv6 message may follow the format specified in DHCPv6 message 302, with varying options in options field 308, as discussed herein. As shown in FIG. 3B, options field 308 of DHCPv6 message 302 may include option code field 310, option length field 312, and option data field 314. Option code field 310 may include an unsigned integer that identifies the specific option type. Option length field 312 may indicate the length of the data in option data field 314 in octets. Option data field 314 may include data for the option.

Figure 3C:
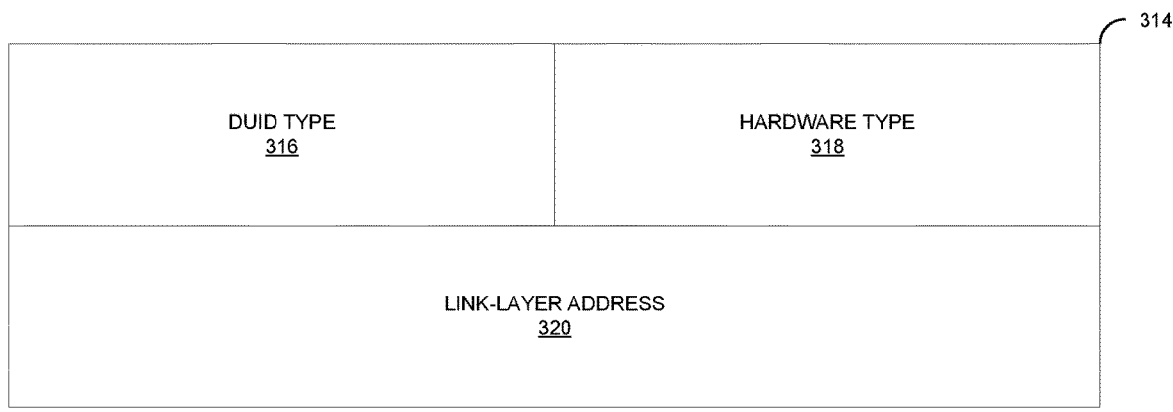

When network device 102 sends a request for an IPv6 address to DHCP server 108, network device 102 may send a DHCPv6 message that includes a client identifier option to uniquely identify itself to DHCP server 108. As shown in FIG. 3C, to include a client identifier option in DHCPv6 message 302, option data field 314 of options field 308 may include DHCP Unique Identifier (DUID) type field 316, hardware type field 318, and link-layer address field 320. DUID type field 316 may include a DUID that uniquely identifies network device 102. Hardware type field 318 may include a value associated with network device 102 as assigned by the Internet Assigned Numbers Authority, and link-layer address field 320 may include the media access control (MAC) address of network device 102.

Figure 3D:
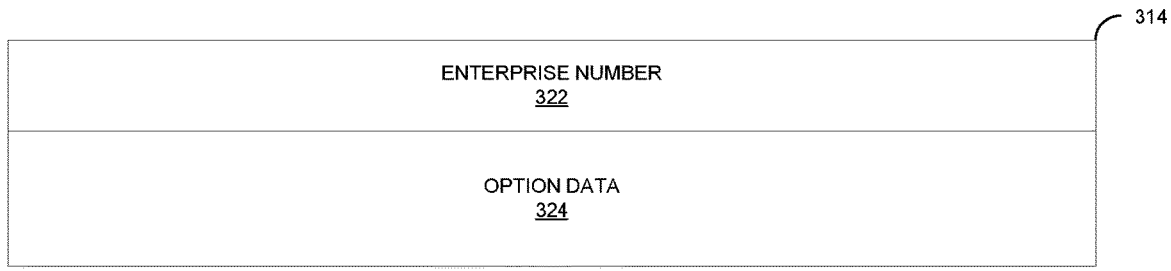

When network device 102 sends a request for an IPv6 address to DHCP server 108, network device 102 may send a DHCPv6 message that also includes a vendor class option to identify the vendor that manufactured network device 102 to DHCP server 108. For example, option code field 310 of option field 308 may specify an OPTION_VENDOR_CLASS value. As shown in FIG. 3D, the option data field 314 of options field 308 when option code field 310 has a value that specifies OPTION_VENDOR_CLASS may include enterprise number field 322 and option data field 324. Enterprise number field 322 may include a value, such as "0x0000B85C", assigned to a particular enterprise vendor. Option data field 324 may include a value that identifies the vendor that manufactured network device 102.

DHCP server 108 may use the option data field 314 of options field 308 of DHCPv6 message 302 to send information associated with NMS 110 to network device 102 in order to trigger the zero touch provisioning. In particular, DHCP server 108 may send a DHCPv6 message 302 with a vendor-specific information portion by specifying a OPTION_VENDOR_OPTS value in option code field 310 of options field 308.

Figure 3E:
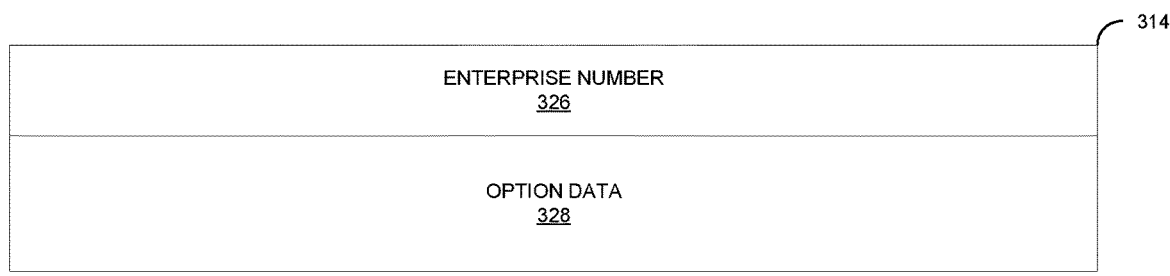

As shown in FIG. 3E, the option data field 314 of options field 308 when option code field 310 has a value that specifies OPTION_VENDOR_OPTS may include enterprise number field 326 and option data field 328. Enterprise number field 326 may include a value, such as "0x0000B85C", assigned to a particular enterprise vendor. Option data field 328 may include information associated with NMS 110, as discussed below.

Figure 3F:
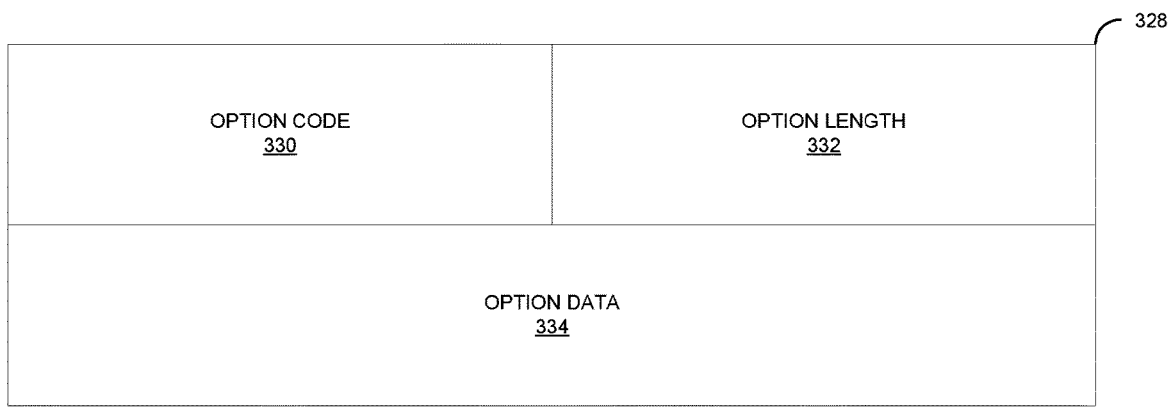

As shown in FIG. 3F, option data field 328 may include option code field 330, option length field 332, and option data field 334. Option code field 330 may include a value that indicates option data field 334 includes information associated with NMS 110. Option length 332 may include a value that indicates the length of the data in option data field 334. Option data field 334 may include information associated with NMS 110 that network device 102 may use to register itself with NMS 110.

In one example, the information associated with NMS in option data 334 may be in the form <Group>:<Topfolder>: <folder1>, <NMS IPv6 Address>, <Shared Secret>. >, <NMS IPv6 Address> may be the IPv6 address for NMS 110.>, <Shared Secret> may be credentials usable by network device 102 to authenticate itself with NMS 110 and to register itself with NMS 110. <Group>:<Topfolder>:<folder1>, <NMS IPv6 Address> may be the location in a directory structure of NMS 110 where configuration files for configuring and/or provisioning network device 102. In this way, DHCP server 108 may send a DHCPv6 message with option data 334 to send information associated with NMS 110 to network device 102.

Figure 4:
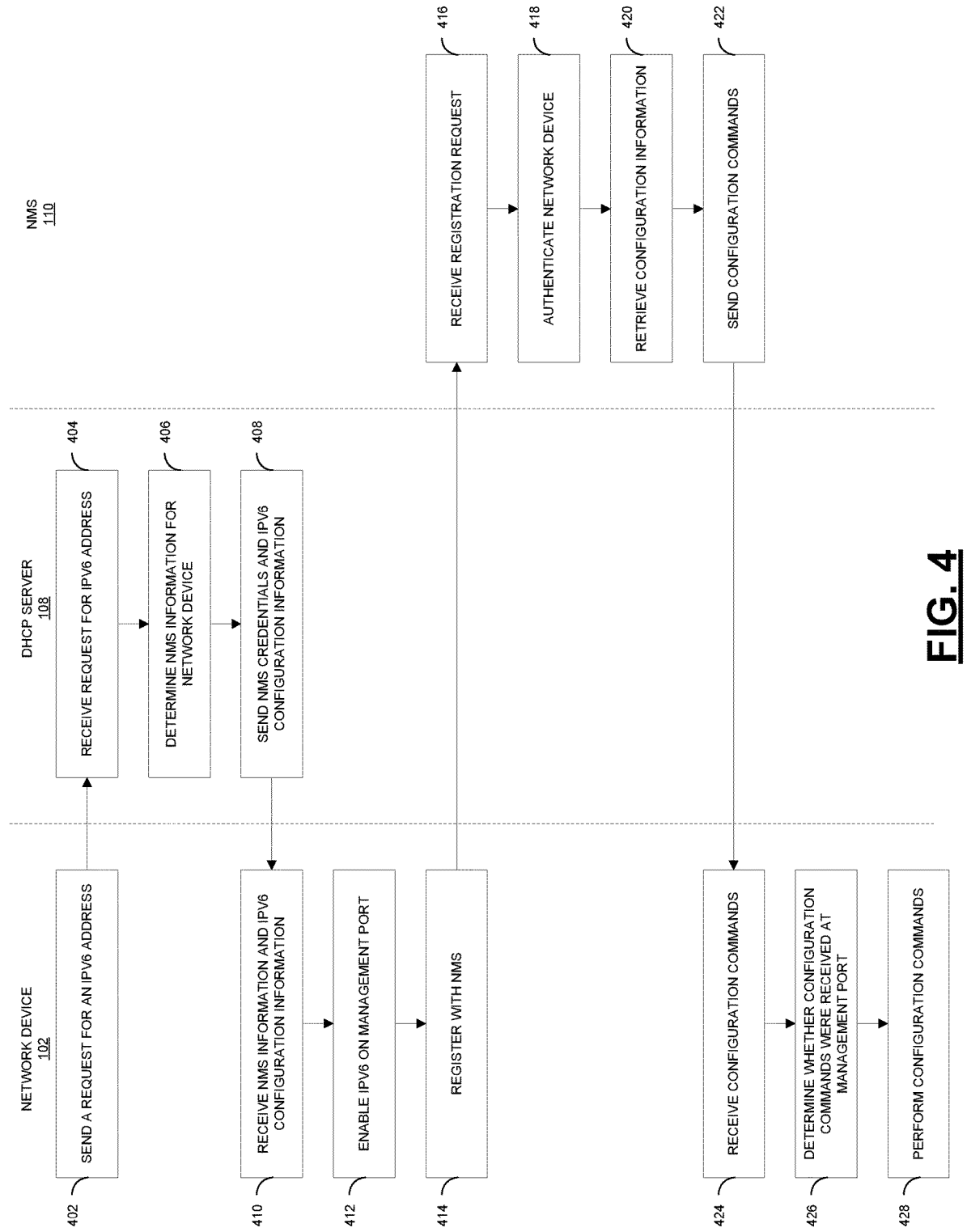
FIG. 4 illustrates an example process for intelligent IPv6 enablement for zero touch provisioning of the example network device of FIGS. 1 and 2 using the example network device, the example DHCP server, and the example NMS of FIGS. 1 and 2.

FIG. 4 illustrates an example process for intelligent IPv6 enablement for zero touch provisioning of example network device 102 using the example network device 102, DHCP server 108, and NMS 110 of FIGS. 1 and 2. While FIG. 4 is described with reference to FIG. 2, it should be noted that the process steps of FIG. 4 may be performed by other systems.

As shown in FIG. 4, network device 102 may send a request for an IPv6 address (402). For example, FIG. 4 may execute an ipv6 address dhcp command that causes network device 102 to send a request for an IPv6 address to DHCP server 108. The request sent by network device 102 may be a DHCPv6 message 302, as shown in FIG. 3A that includes a client identifier option to uniquely identify itself to DHCP server 108, as shown in FIG. 3C as well as the vendor class option to identify the vendor that manufactured network device 102, as shown in FIG. 3D.

DHCP server 108 may receive the request for the IPv6 address from network device 102 (404) and may determine the NMS credentials for network device 102 (406). DHCP server 108 may determine the appropriate NMS credentials for network device 102 based at least in part on the client identifier option and/or the vendor class option specified in the DHCPv6 message sent by network device 102 as part of the request for the IPv6 address. For example, the NMS credentials may include the network address of NMS 110, a shared secret for authenticating with NMS 110, and a file path in the directory structure of NMS 110 where the configuration information for configuring network device 102 is located. NMS 110 may store different configuration information for configuring network devices manufactured by different vendors. As such, the file path in the directory structure of NMS 110 for the configuration information for configuring network device 102 may depend on the vendor of network device 102 as indicated by the vendor class option specified in the DHCPv6 message sent by network device 102.

DHCP server 108 may send the NMS credentials and the IPv6 configuration information to network device 102 (408) and network device 102 may receive the NMS credentials and the IPv6 configuration information (410). In response to receiving the IPv6 configuration information, network device 102 may enable IPv6 on its management port based on the IPv6 configuration information received from DHCP server 108 (412). For example, network device 102 may assign the IPv6 address indicated by the IPv6 configuration information to management port 218B of network device 102 to enable management port 218B for IPv6 processing.

In response to receiving the NMS credentials, network device 102 may register itself with NMS 110 based at least in part on the NMS credentials received from DHCP server 108 (414). For example, network device 102 may communicate with NMS 110 at the network address of NMS 110 included in the NMS credentials, and may send an indication of the shared secret and an indication of the file path in the directory structure of NMS 110 where the configuration information for configuring network device 102 is located NMS 110 may receive the registration request from network device 102 (416) and may authenticate network device 102 based on the registration request (418). For example, the registration request may include a shared secret that NMS 110 may verify to authenticate network device 102. NMS 110 may retrieve configuration information for configuring network device 102 based at least in part on the registration request (420). For example, the registration request may include a file path in the directory structure of NMS 110 where the configuration information for configuring network device 102 is located.

NMS 110 may send the configuration information for configuring network device 102 to network device 102 (422). Network device 102 may receive the configuration information from NMS 110 (424) and may determine whether the configuration information was received at the management port of network device 102 (426). If network device 102 determines that the configuration information was received at the management port of network device 102, network device 102 may configure itself according to the configuration information (428). For example, if the configuration information includes one or more configuration scripts, network device 102 may execute the configuration commands contained in the one or more configuration scripts to configure itself, thereby achieving zero touch provisioning.

Figure 5:
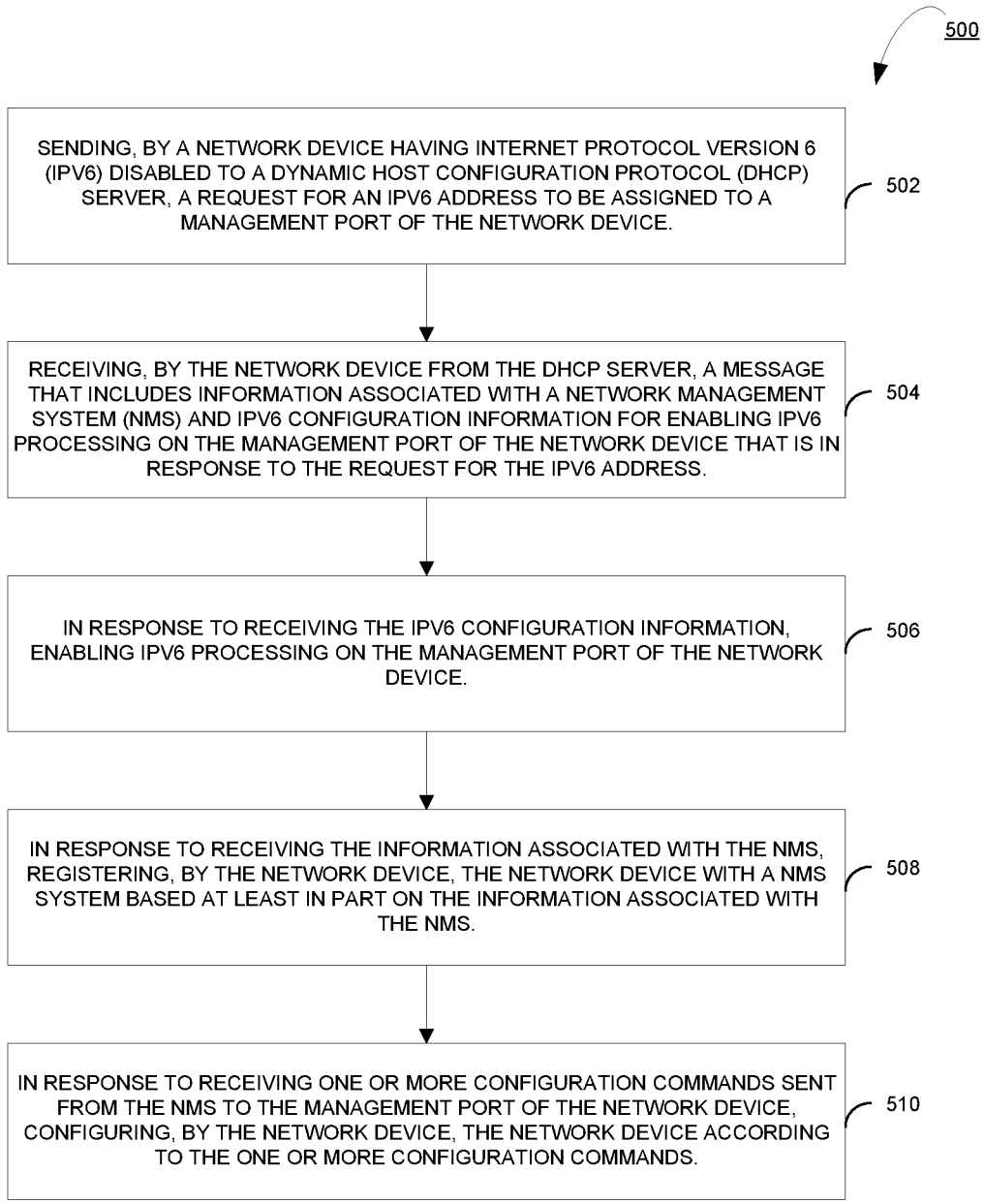
FIG. 5 illustrates an example process for intelligent IPv6 enablement for zero touch provisioning of the example network device of FIGS. 1 and 2 using the example network device, the example DHCP server, and the example NMS of FIGS. 1 and 2.

FIG. 5 illustrates an example process 500 for intelligent Internet Protocol version 6 (IPv6) enablement for zero touch provisioning of example network device 102 using the example network device 102, example DHCP server 108, and example NMS 110 of FIGS. 1 and 2. While FIG. 5 is described with reference to FIGS. 1 and 2, it should be noted that the process steps of FIG. 5 may be performed by other systems.

The process 500 begins by proceeding to step 502 where network device 102 having Internet Protocol version 6 (IPv6) disabled sends a request to DHCP server 108 for an IPv6 address to be assigned to management port 218B of network device 102.

In some examples, network device 102 sending the request for the IPv6 address includes network device 102 sending one or more Dynamic Host Configuration Protocol version 6 (DHCPv6) messages to the DHCP server. In some examples, the one or more DHCPv6 messages include a vendor class option that identifies a vendor that manufactured network device.

In some examples, DHCP client receive task 222A executing at network device 102 may block on a sock bound to management port 218B and a port for communicating with DHCP server 108. DHCP client receive task 222A may execute at network device 102 may, in response to receiving an incoming data packet at the socket, post the incoming data packet to a message queue associated with DHCP client control task 222B. In some examples, DHCP client control task 222B may execute at network device 102 to send outgoing data packet as a multicast message via the socket to DHCP server 108.

The process 500 proceeds to step 504, where network device 102 receives from DHCP server 108 a message that includes information associated with NMS 110 and IPv6 configuration information for enabling IPv6 processing on management port 218B of network device 102 that is in response to the request for the IPv6 address. In some examples, DHCP server 108 may determine the information associated with NMS 110 based at least in part on the vendor class option included in the one or more DHCPv6 messages.

The process 500 proceeds to step 506, where network device 102, in response to receiving the IPv6 configuration information, enables IPv6 processing on management port 218B of network device 102. The process 500 proceeds to step 508, where network device 102, in response to receiving the information associated with NMS 110, registers network device 102 with NMS 110 based at least in part on the information associated with NMS 110.

In some examples, the information associated with NMS 110 includes a network address of NMS 110, and network device 102 may register with NMS 110 by communicating with NMS 110 at the network address. In some examples, the information associated with NMS 110 includes a shared secret used to authenticate network device 102 with NMS 110, and network device 102 may register with NMS 110 by authenticating network device 102 with NMS 110 using the shared secret. In some examples, the information associated with NMS 110 includes an indication of a location of a configuration script that contains the one or more configuration commands within a directory structure of NMS 110, and network device 102 may register with NMS 110 by sending to NMS 110 the indication of the location of the configuration script within the directory structure of NMS 110.

The process 500 proceeds to step 510, where network device 102, in response to receiving one or more configuration commands sent from NMS 110 to management port 218B of network device 102, configures network device 102 according to the one or more configuration commands. In some examples, network device 102 may determine whether the one or more configuration commands were received by management port 218B of network device 102 and may, in response to determining the configuration commands were received by management port 218B of network device 102, configure network device 102 according to the one or more configuration commands.

In some examples, network device 102 may receive a second one or more commands. Network device 102 may determine whether the second one or more configuration commands were received by management port 218B of network device 102. Network device 102 may, in response to determining that the second one or more configuration commands were not received by management port 218B of network device 102, refrain from configuring network device 102 according to the second one or more configuration commands.

Hardware Overview

Figure 6:
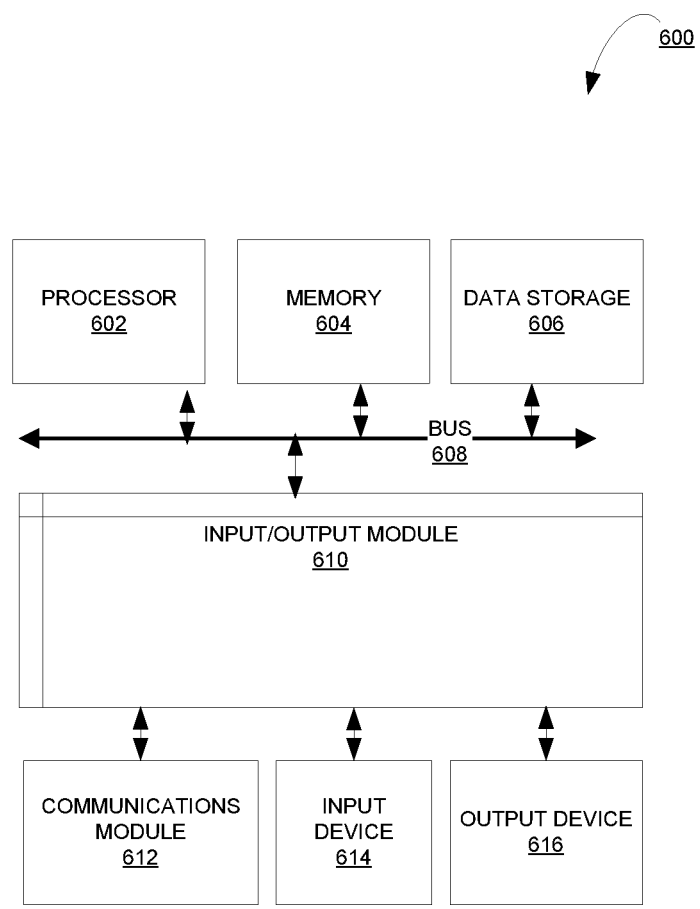
FIG. 6 is a block diagram illustrating an example computer system with which the example network device of FIGS. 1 and 2 can be implemented.

FIG. 6 is a block diagram illustrating an example computer system 600 with which network device 102 of FIGS. 1 and 2 can be implemented. In certain aspects, the computer system 600 may be implemented using hardware or a combination of software and hardware, either in a dedicated server, or integrated into another entity, or distributed across multiple entities.

Computer system 600 (e.g., network device 102) includes a bus 608 or other communication mechanism for communicating information, and a processor 602 (e.g., processor 212) coupled with bus 608 for processing information. According to one aspect, the computer system 600 can be a cloud computing server of an IaaS that is able to support PaaS and SaaS services. According to one aspect, the computer system 600 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 600 may be implemented with one or more processors 602. Processor 602 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry. Expansion memory may also be provided and connected to computer system 600 through input/output module 610, which may include, for example, a SIMM (Single In Line Memory Module) card interface. Such expansion memory may provide extra storage space for computer system 600, or may also store applications or other information for computer system 600. Specifically, expansion memory may include instructions to carry out or supplement the processes described above, and may include secure information also. Thus, for example, expansion memory may be provided as a security module for computer system 600, and may be programmed with instructions that permit secure use of computer system 600. In addition, secure applications may be provided via the SIMM cards, along with additional information, such as placing identifying information on the SIMM card in a non-hackable manner.

The instructions may be stored in the memory 604 and implemented in one or more computer program products, e.g., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Example input/output modules 610 include data ports such as USB ports. In addition, input/output module 610 may be provided in communication with processor 602, so as to enable near area communication of computer system 600 with other devices. The input/output module 610 may provide, for example, for wired communication in some implementations, or for wireless communication in other implementations, and multiple interfaces may also be used. The input/output module 610 is configured to connect to a communications module 612. Example communications modules 612 (e.g., communication module 218) include networking interface cards, such as Ethernet cards and modems.

The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 612 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 612 sends and receives electrical, electromagnetic or optical signals that carry digital data streams representing various types of information. The network link typically provides data communication through one or more networks to other data devices. For example, the network link of the communications module 612 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 612, which carry the digital data to and from computer system 600, are example forms of transmission media.

Computer system 600 can send messages and receive data, including program code, through the network(s), the network link and communications module 612. In the Internet example, a server might transmit a requested code for an application program through Internet, the ISP, the local network and communications module 612. The received code may be executed by processor 602 as it is received, and/or stored in data storage 606 for later execution.

In certain aspects, the input/output module 610 is configured to connect to a plurality of devices, such as an input device 614 and/or an output device 616. Example input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 616 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 616 may comprise appropriate circuitry for driving the output device 616 to present graphical and other information to a user.

According to one aspect of the present disclosure, network device 102 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. Processor 602 may process the executable instructions and/or data structures by remotely accessing the computer program product, for example by downloading the executable instructions and/or data structures from a remote server through communications module 612 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 602 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 608. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for intelligent Internet Protocol version 6 (IPv6) enablement for zero touch provisioning of a network device, comprising:
    sending, by a network device having Internet Protocol version 6 (IPv6) disabled to a Dynamic Host Configuration Protocol (DHCP) server, a request for an IPv6 address to be assigned to a management port of the network device;
    receiving, by the network device from the DHCP server, a message that includes information associated with a network management system (NMS) and IPv6 configuration information for enabling IPv6 processing on the management port of the network device that is in response to the request for the IPv6 address;
    in response to receiving the IPv6 configuration information, enabling IPv6 processing on the management port of the network device;
    in response to receiving the information associated with the NMS, registering, by the network device, the network device with the NMS based at least in part on the information associated with the NMS; and
    in response to receiving one or more configuration commands sent from the NMS to the management port of the network device, configuring, by the network device, the network device according to the one or more configuration commands.

2. The computer-implemented method of claim 1, wherein configuring the network device according to the configuration commands further comprises:
    determining, by the network device, whether the one or more configuration commands were received by the management port of the network device; and
    in response to determining that the one or more configuration commands were received by the management port of the network device, configuring, by the network device, the network device according to the one or more configuration commands.

3. The computer-implemented method of claim 2, further comprising:
receiving, by the network device, a second one or more configuration commands;
determining, by the network device, whether the second one or more commands were received by the management port of the network device; and
in response to determining that the second one or more configuration commands were not received by the management port of the network device, refraining, by the network device, from configuring the network device according to the second one or more configuration commands.

4. The computer-implemented method of claim 1, wherein the information associated with the NMS includes a network address of the NMS, and wherein registering the network device with the NMS based at least in part on the information associated with the NMS comprises communicating, by the network device, with the NMS at the network address.

5. The computer-implemented method of claim 1, wherein the information associated with the NMS includes a shared secret used to authenticate the network device with the NMS, and wherein registering the network device with the NMS based at least in part on the information associated with the NMS comprises authenticating, by the network device, with the NMS using the shared secret.

6. The computer-implemented method of claim 1, wherein the information associated with the NMS includes an indication of a location of a configuration script that contains the one or more configuration commands within a directory structure of the NMS, and wherein registering the network device with the NMS based at least in part on the information associated with the NMS comprises sending, by the network device to the NMS, the indication of the location of the configuration script within the directory structure of the NMS.

7. The computer-implemented method of claim 1, wherein sending the request for the IPv6 address includes sending one or more Dynamic Host Configuration Protocol version 6 (DHCPv6) messages to the DHCP server.

8. The computer-implemented method of claim 7, wherein the one or more DHCPv6 messages include a vendor class option that identifies a vendor that manufactured network device, and wherein the information associated with the NMS is determined based at least in part on the vendor class option.

9. The computer-implemented method of claim 7, further comprising:
blocking, by a DHCP client receive task executing at the network device, on a socket bound to the management port and a port for communicating with the DHCP server; and
in response to receiving an incoming data packet at the socket, posting, by the DHCP client receive task executing at the network device, the incoming data packet to a message queue associated with a DHCP client control task.

10. The computer-implemented method of claim 9, further comprising:
sending, by the DHCP client control task executing at the network device, an outgoing data packet as a multicast message via the socket to the DHCP server.

11. A network device having for intelligent Internet Protocol version 6 (IPv6) enablement for zero touch provisioning, comprising:
a memory;
a management port; and
a processor operably coupled to the memory and the management port and configured to execute instructions which, when executed, cause the processor to:
send, to a Dynamic Host Configuration Protocol (DHCP) server, a request for an Internet Protocol version 6 (IPv6)address to be assigned to the management port of the network device, wherein IPv6 is disabled at the network device;
receive, from the DHCP server, a message that includes information associated with a network management system (NMS) and IPv6 configuration information for enabling IPv6 processing on the management port of the network device that is in response to the request for the IPv6 address;
in response to receiving the IPv6 configuration information, enable IPv6 processing on the management port of the network device;
in response to receiving the information associated with the NMS, register with the NMS based at least in part on the information associated with the NMS; and
in response to receiving one or more configuration commands sent from the NMS to the management port of the network device, configure the network device according to the one or more configuration commands.

12. The network device of claim 11, wherein the processor, when configured to execute the instructions to configure the network device according to the one or more configuration commands is further configured to execute the instructions to:
determine whether the one or more configuration commands were received by the management port of the network device; and
in response to determining that the one or more configuration commands were received by the management port of the network device, configure the network device according to the one or more configuration commands.

13. The network device of claim 12, wherein the processor is further configured to execute the instructions to:
determine a second one or more configuration commands;
determine whether the second one or more commands were received by the management port of the network device; and
in response to determining that the second one or more configuration commands were not received by the management port of the network device, refrain from configuring the network device according to the second one or more configuration commands.

14. The network device of claim 11, wherein the information associated with the NMS includes a network address of the NMS, and wherein the processor, when configured to execute the instructions to register the network device with the NMS based at least in part on the information associated with the NMS, is further configured to execute the instructions to communicate with the NMS at the network address.

15. The network device of claim 11, wherein the information associated with the NMS includes a shared secret used to authenticate the network device with the NMS, and wherein the processor, when configured to execute the instructions to register the network device with the NMS based at least in part on the information associated with the NMS, is further configured to execute the instructions to authenticate with the NMS using the shared secret.

16. The network device of claim 11, wherein the information associated with the NMS includes an indication of a location of a configuration script that contains the one or more configuration commands within a directory structure of the NMS, and wherein the processor, when configured to execute the instructions to register the network device with the NMS based at least in part on the information associated with the NMS, is further configured to execute the instructions to send, to the NMS, the indication of the location of the configuration script within the directory structure of the NMS.

17. The network device of claim 11, wherein the processor, when configured to execute the instructions to send the request for the IPv6 address to the DHCP server, is further configured to execute the instructions to send one or more Dynamic Host Configuration Protocol version 6 (DHCPv6) messages to the DHCP server.

18. The network device of claim 17, wherein the one or more DHCPv6 messages include a vendor class option that identifies a vendor that manufactured network device, and wherein the information associated with the NMS is determined based at least in part on the vendor class option.

19. The network device of claim 17, wherein the processor is further configured to:
   execute a DHCP client receive task executing at the network device to block on a socket bound to the management port and a port for communicating with the DHCP server; and
   in response to receiving an incoming data packet at the socket, execute the DHCP client receive task to post the incoming data packet to a message queue associated with a DHCP client control task.

20. A non-transitory machine-readable storage medium comprising machine-readable instructions for causing a processor of a network device to execute a method for intelligent Internet Protocol version 6 (IPv6) enablement for zero touch provisioning, comprising:
   sending, to a Dynamic Host Configuration Protocol (DHCP) server, a request for an Internet Protocol version 6 (IPv6) address to be assigned to a management port of the network device, wherein IPv6 is disabled at the network device;
   receiving, from the DHCP server, a message that includes information associated with a network management system (NMS) and IPv6 configuration information for enabling IPv6 processing on the management port of the network device that is in response to the request for the IPv6 address;
   in response to receiving the IPv6 configuration information, enabling IPv6 processing on the management port of the network device;
   in response to receiving the information associated with the NMS, registering with the NMS based at least in part on the information associated with the NMS; and
   in response to receiving one or more configuration commands sent from the NMS to the management port of the network device, configuring the network device according to the one or more configuration commands.

* * * * *